United States Patent [19]

Martin

[11] Patent Number: 4,728,842
[45] Date of Patent: Mar. 1, 1988

[54] LAMINATED ASSEMBLY FOR A DYNAMOELECTRIC MACHINE AND METHOD FOR MANUFACTURING LAMINATED ASSEMBLIES HAVING RIDGES FORMED ON PROJECTIONS WHICH INTERLOCK WITH RECESSES OF ADJACENT LAMINATIONS

[75] Inventor: Benson D. Martin, Pontiac, Mich.
[73] Assignee: Carbet Corporation, Pontiac, Mich.
[21] Appl. No.: 912,840
[22] Filed: Sep. 29, 1986
[51] Int. Cl.$^4$ .............................................. H02K 1/06
[52] U.S. Cl. ..................................... 310/217; 29/596; 29/598; 29/609; 29/736; 29/738; 29/564.2; 72/327; 310/42
[58] Field of Search .................. 29/596, 598, 605, 609, 29/736, 738, 564.2; 72/326, 327, 379; 310/216, 217, 42

[56] References Cited

U.S. PATENT DOCUMENTS

| | | | |
|---|---|---|---|
| 2,226,819 | 12/1940 | Jeffries | 29/159.2 |
| 2,975,312 | 3/1961 | Ploran | 310/217 |
| 3,110,831 | 11/1963 | Zimmerle | 310/217 |
| 3,202,851 | 8/1965 | Zimmerle et al. | 310/259 |
| 3,203,077 | 8/1965 | Zimmerle | 29/155.5 |
| 3,210,824 | 10/1965 | Zimmerle | 29/33 |
| 3,387,481 | 6/1968 | Harvey et al. | 72/379 |
| 3,599,469 | 8/1971 | Bassoff | 72/343 |
| 4,254,540 | 3/1981 | Bilak | 72/379 |
| 4,280,275 | 7/1981 | Mitsui | 29/732 |
| 4,356,605 | 11/1982 | Everts | 29/609 |
| 4,364,169 | 12/1982 | Kawano et al. | 29/596 |
| 4,438,558 | 3/1984 | Mitsui | 29/732 |
| 4,507,947 | 4/1985 | Stanley | 72/130 |
| 4,538,345 | 9/1985 | Diederichs | 29/596 |

FOREIGN PATENT DOCUMENTS 409185  4/1934  United Kingdom .................. 72/327

Primary Examiner—P. W. Echols
Attorney, Agent, or Firm—Basile and Hanlon

[57] ABSTRACT

A method and apparatus for manufacturing laminated assemblies having ridges formed on projections which interlock with recesses of adjacent laminations. The improvement to the laminated assembly is a projection with a smaller cross-sectional area than the recess and with a plurality of exterior longitudinal ridges protruding from the projection surface for securing adjacent laminations together by compressive interference fit between the ridges and the recess in interlocking relationship throughout the laminated assembly. An improvement in the method for the manufacture of a pack of metal laminae by use of a multistation progressive die operation on a strip of material, during the step of punching the recesses and simultaneously forming interlocking projections in a lower die, the improvement being forming the projection with a smaller cross-sectional area than the recess and with a plurality of exterior longitudinal ridges protruding from the projection surface for securing adjacent laminations together by compressive interference fit between the ridges and the wall of the recess. The projection is formed in a lower die of the multistation progressive die apparatus, wherein the lower die has a plurality of longitudinal grooves on the interior surface of the lower die to produce the ridges protruding from the circumferential surface of the projection simultaneously as the punch produces the recess in the upper portion of the plate.

8 Claims, 7 Drawing Figures

LAMINATED ASSEMBLY FOR A DYNAMOELECTRIC MACHINE AND METHOD FOR MANUFACTURING LAMINATED ASSEMBLIES HAVING RIDGES FORMED ON PROJECTIONS WHICH INTERLOCK WITH RECESSES OF ADJACENT LAMINATIONS

BACKGROUND OF THE INVENTION

1. Field of the Invention

The present invention relates to methods and apparatuses for manufacturing laminated assemblies for electrical machinery and appliances, such as rotors and stators, having interlocking projections and recesses for securing adjacent laminations together by compressive interference fit throughout the entire length of the laminated assembly.

2. Description of the Prior Art

Laminated assemblies having interlocking projections and recesses are known in the art. For instance, U.S. Pat. No. 2,975,312 discloses the use of interlocking projections and recesses having the same identical outlines and dimensions. Various other uses for the projections and recesses are disclosed in U.S. Pat. Nos. 4,538,345; 4,364,169; 3,203,077 and 3,202,851. However, the known methods and apparatuses for manufacturing laminated assemblies using projections and recesses for securing adjacent laminations together tend to cause deformation of the laminated plates during and after compressive fit of the projection into the recess.

It is a desirable characteristic of the present invention to reduce the amount of distortion inherent in the compressive fit of interlocking projections and recesses of adjacent laminated plate packs.

It is also a desirable characteristic to reduce the amount of compressive force required to achieve the compressive fit interlock of a laminated plate pack.

Furthermore, it is a desirable characteristic to increase the holding pressure of the interlocked laminated plate pack.

SUMMARY OF THE INVENTION

The present invention relates to an improvement in the method and apparatus for manufacturing laminated assemblies having interlocking projections and recesses. The improvement reduces the cross-sectional area of the projection, making it smaller than the cross-sectional area of the recess, while forming a plurality of exterior, longitudinal ridges protruding from the projection surface. The projection is secured into the recess of an adjacent lamination by compressive interference fit between the ridges on the projection and the recess. The improved projection has ridges formed in a multistation progressive die manufacturing and assembling apparatus for laminated electrical machinery and appliances, such as rotors and stators, of the type including a punch and a lower die for forming interlocking projections and recesses. The lower die has a plurality of longitudinal grooves on the interior surface of a bore in the lower die. The grooves in the lower die produce the ridges protruding from the circumferential surface of the projection during the punching operation, while the punch forms the recess in the laminated plate.

Further advantages and uses of the present invention will be apparent to those skilled in the art upon examination of the following drawings and description of the preferred embodiments.

DESCRIPTION OF THE PREFERRED EMBODIMENTS

The present invention is incorporated into a multistation progressive die apparatus for manufacturing and assembling laminated electrical machinery and appliances, such as rotors and stators. A progressive die operation is performed by the multistation progressive die apparatus on a strip of material and typically includes the steps of forming pilot holes, forming stator slots and relief holes, forming rotor slots and shaft holes, punching interlock projections and recesses, punching out the rotor, shaving the inner diameter of the stators, trimming outer diameters of stators, forming shading coil slots, cutting stators apart, stacking stators or rotors, and compressing stacked stators or rotors. The step of punching interlock projections and recesses is typically performed at a station having one or more punches and corresponding lower dies, wherein the punch forms a recess in one side of a plate while a projection is formed by the lower die on the opposite side of the plate.

Figure 1:
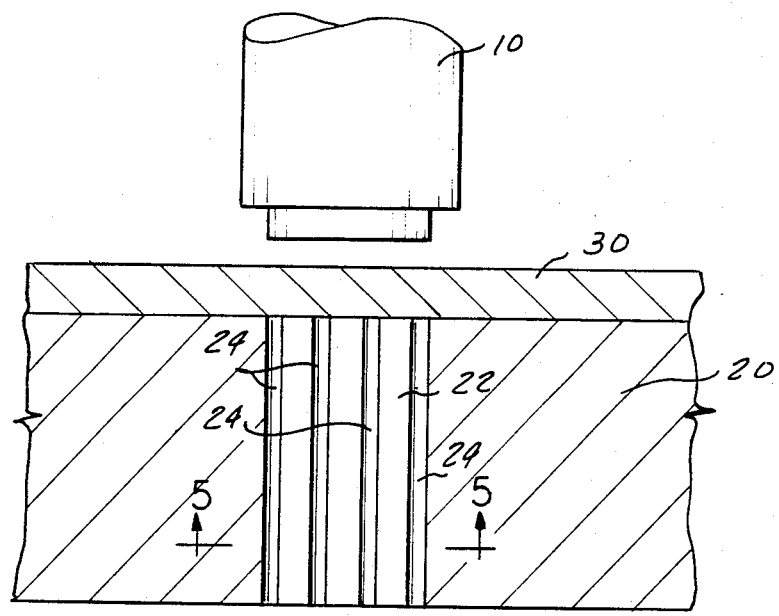
FIG. 1 is a partial cross-sectional view of a punching station for forming an interlocking projection and recess prior to operation of the punch.

Referring now to FIG. 1, a punch 10 and a lower die 20 are shown, representing the one or more corresponding pairs of punches and lower dies present in a station for punching interlocking projections and recesses. The lower die 20 has an aperture 22 with a plurality of longitudinal grooves 24 on the interior surface of the lower die 20. A plate 30 is positioned on the upper surface of the lower die 20 between the lower die 20 and the punch 10.

Figure 2:
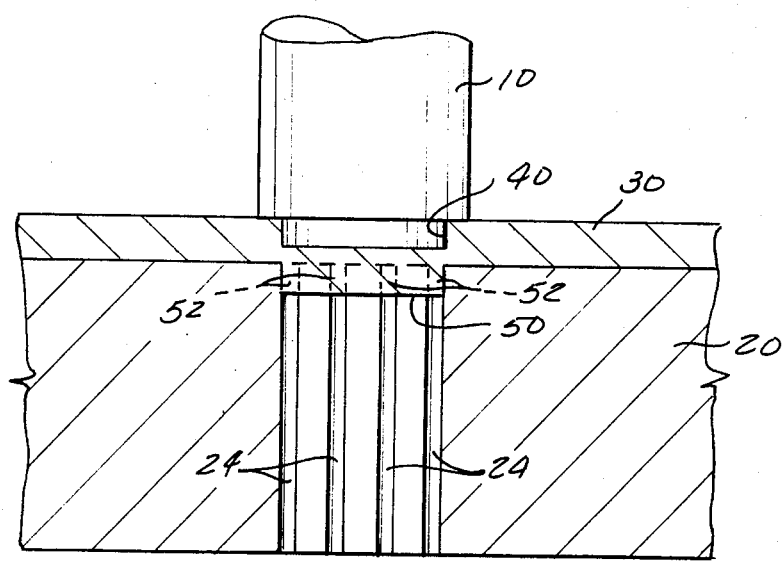
FIG. 2 shows the same punching station as depicted in FIG. 1 with the punch in its lowermost position.
Figure 3:
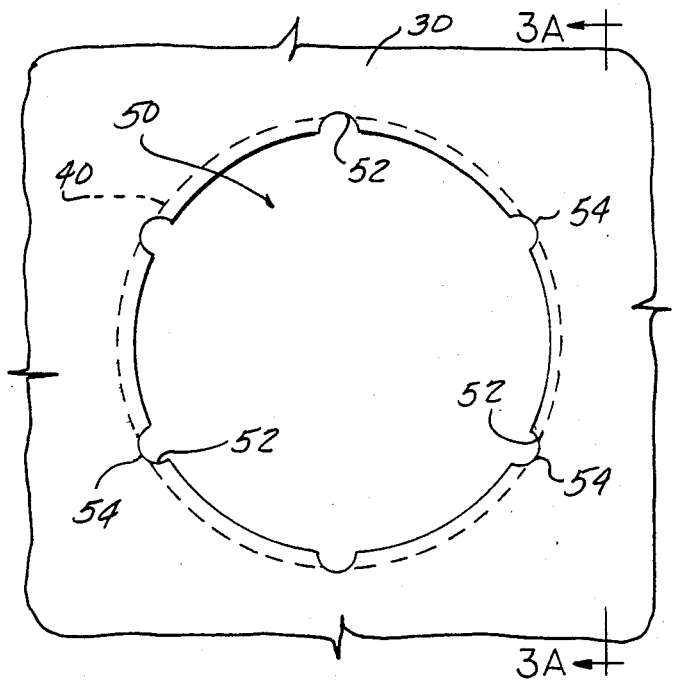
FIG. 3 is a view of the plate showing the projection after it is formed.
Figure 3A:
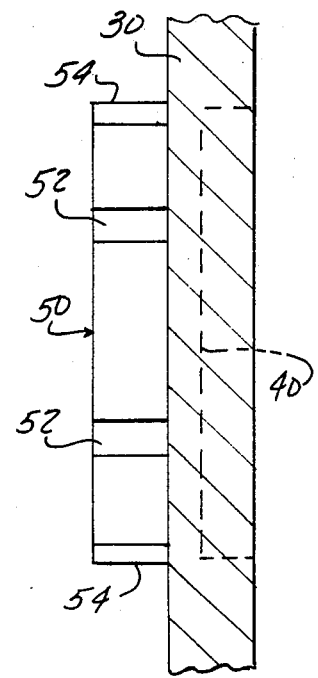
FIG. 3A is a side view of the plate shown in FIG. 3.

Referring now to FIG. 2, the punch 10 is shown in its lowermost position having formed a recess 40 in the upper surface of the plate 30, and a projection 50 having been formed in the lower die 20. The longitudinal grooves 24 in the lower die 20 produce ridges 52 protruding from the circumferential surface of the projection 50 as the punch 10 forms the recess 40 in the upper part of the plate 30. The projection 50 formed in accordance with the present invention has a smaller cross section than the recess 40. As can best be seen in FIG. 3 and FIG. 3A, the outermost edge 54 of the ridges 52 on the circumferential surface of the projection 50 project beyond the outer dimension of the recess 40 formed in the opposite side of the plate 30. A preferred embodiment has the outmost edge 54 of the ridge 52 extending approximately 0.0005 inch beyond the outer dimension of the recess 40, the diameter from the outermost edge 54 to an opposing outermost edge 54 being approximately 0.001 inch greater than the diameter of the recess 40.

Figure 4:
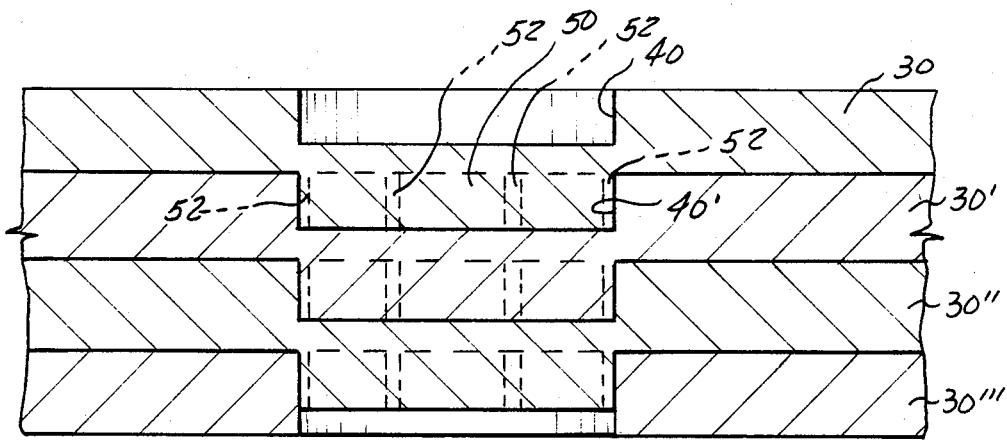
FIG. 4 is a cross-sectional view of a compressed stack of laminated plates.

After the plates are stacked and compressed, the laminated assembly is in an interlocking relationship progressively throughout the length of the assembly as depicted in FIG. 4. FIG. 4 shows a plurality of plates 30 having interlocking projections 50 and recesses 40 in which the projection 50 of a first plate 30 is compressed into a recess 40' of a second plate 30' (and third plate 30''), resulting in an interference fit between the ridges 52 on the projection 50 and the wall of the recess 40' of an adjacent plate 30'. The lowermost plate 30''' in a laminated assembly, as shown in FIG. 4, has the projections removed to separate the laminated plates into stacks, thereby facilitating storage and handling of the assemblies.

Referring again to FIGS. 3 and 3A, a preferred embodiment of the projection 50 has at least six ridges 52. Another preferred embodiment of the projection 50 has ridges 52 formed with a partial circular cross section. The outer periphery of the ridge 52 can be defined by an arc having at least a 0.01 inch diameter D. Yet, another preferred embodiment defines the distance X that the ridge protrudes from the projection to be at least 0.0005 inch. The improvement of the present invention can also be defined in the embodiment comprising a projection 50 with a smaller cross-sectional area than the recess 40, the projection having a diameter of approximately 0.1493 inch and at least six exterior longitudinal ridges 52 with partial circular cross sections whose outer periphery is defined by an arc having at least a 0.01 inch diameter D and which protrudes from the surface of the projection by a distance X of at least 0.0005 inch, while the recess 40 has a diameter of approximately 0.1500 inch.

Figure 5:
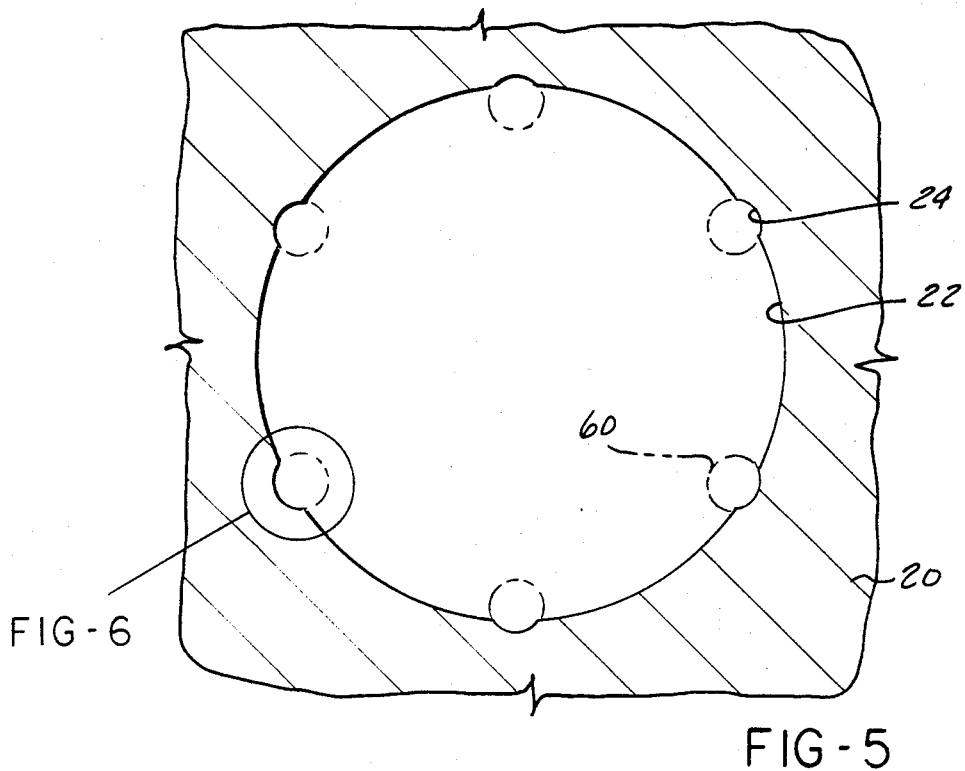
FIG. 5 is a cross-sectional view of the lower die associated with the punching station.
Figure 6:
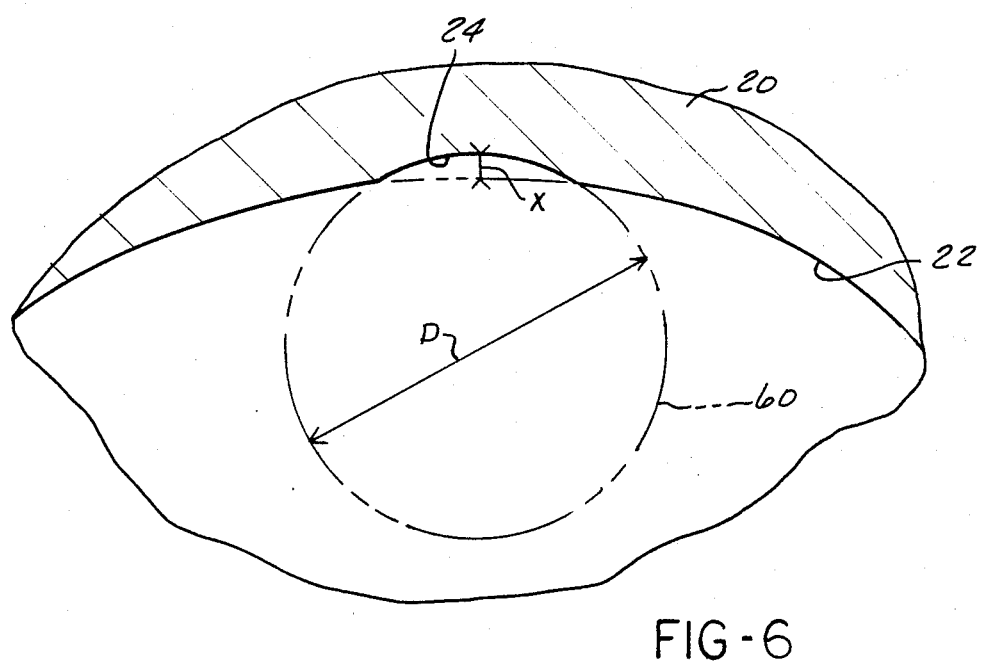
FIG. 6 is a detailed view of one of the grooves in the lower die.

FIG. 5 shows a cross-sectional view of the lower die 20 used to form the projection 50. The lower die 20 has a plurality of grooves 24 evenly spaced about the periphery of the aperture 22. The grooves 24 extend longitudinally along the axis of the aperture 22, as shown in FIG. 1. It is preferable that there be at least six grooves 24 formed in the wall of the lower die 20. In a preferred embodiment, each groove 24 is formed and shaped as shown in FIG. 6. A 0.01 inch diameter D wire 60 (shown in phantom) is used to burn a groove 24 in the surface of the aperture 22 of the lower die 20 to a depth X of 0.0005 inch. The diameter of the aperture 22 preferably is approximately 0.1493 inch, while the punch 10 (shown in FIG. 1 and FIG. 2) has a diameter of approximately 0.1500 inch for forming the recess 40.

What is claimed is:

1. In a laminated assembly for a dynamoelectric machine of the type having interlocking projections and recesses for securing adjacent laminations together in interlocking relationship progressively throughout the length of the assembly, the improvement comprising:
    an interlocking projection with a smaller cross-sectional area than the recess, and having a plurality of exterior longitudinal ridges protruding from the projection surface for securing adjacent laminations together by compressive interference fit between the ridges and the recess in interlocking relationship throughout the laminated assembly.

2. The improvement according to claim 1, wherein the projection has at least six ridges.

3. The improvement according to claim 1, wherein each ridge has a partial circular cross section.

4. The improvement according to claim 3, wherein the partial circular cross section has an outer periphery defined by an arc having at least a 0.01 inch diameter.

5. The improvement according to claim 1 wherein each of the plurality of ridges protrudes from the projection by at least 0.0005 inch.

6. In a laminated assembly for a dynamoelectric machine of the type having interlocking projections and recesses for securing adjacent laminations together in interlocking relationship progressively throughout the length of the assembly, the improvement comprising:
    an interlocking projection with a smaller cross-sectional area than the recess, and having at least six exterior longitudinal ridges with partial circular cross sections whose outer periphery is defined by an arc having at least a 0.01 inch diameter and which protrudes from the projection by at least 0.0005 inch.

7. A method for the manufacture of a laminated assembly for an electric machine having interlocking projections and recesses for securing adjacent laminations together in interlocking relationship progressively throughout the length of the assembly prepared by a process including the steps of forming pilot holes, forming stator slots and relief holes, forming rotor slots and shaft holes, punching interlock projections and recesses, punching out the rotor, shaving the inner diameters of the stators, trimming outer diameters of the stators, forming shading coil slots, cutting stators apart, stacking laminations, and compressing stacked laminations, comprising the steps:
    punching to form a projection with a smaller cross-sectional area than the recess and with a plurality of exterior longitudinal ridges protruding from the projection surface and securing adjacent laminations together by compressing the laminations whereby an interference fit occurs between the ridges on the projection and the recess of an adjacent lamination.

8. In a method for the manufacture of a pack of metal lamina for electrical machinery and appliances by use of a progressive die operation on a strip of material including the step of punching interlocking projections and recesses, the improvement comprising:
    forming the projection with a smaller cross-sectional area than the recess and with a plurality of exterior longitudinal ridges protruding from the projection surface for securing adjacent laminations together by compressive interference fit between the ridges and the recess in interlocking relationship throughout the pack.

* * * * *